United States Patent
Fangmann

(10) Patent No.: US 11,585,376 B2
(45) Date of Patent: Feb. 21, 2023

(54) RUBBER BUSH

(71) Applicant: BOGE ELASTMETALL GMBH, Damme (DE)

(72) Inventor: Michael Fangmann, Lohne (DE)

(73) Assignee: BOGE ELASTMETALL GMBH, Damme (DE)

( * ) Notice: Subject to any disclaimer, the term of this patent is extended or adjusted under 35 U.S.C. 154(b) by 242 days.

(21) Appl. No.: 17/045,170

(22) PCT Filed: Apr. 3, 2019

(86) PCT No.: PCT/EP2019/058442
§ 371 (c)(1),
(2) Date: Oct. 4, 2020

(87) PCT Pub. No.: WO2019/193076
PCT Pub. Date: Oct. 10, 2019

(65) Prior Publication Data
US 2021/0148402 A1  May 20, 2021

(30) Foreign Application Priority Data

Apr. 5, 2018 (DE) ............... 10 2018 108 029.8

(51) Int. Cl.
*F16C 27/06* (2006.01)
*F16F 1/30* (2006.01)
*F16F 1/38* (2006.01)

(52) U.S. Cl.
CPC .............. *F16C 27/063* (2013.01); *F16F 1/30* (2013.01); *F16F 1/3842* (2013.01); *F16F 1/3863* (2013.01)

(58) Field of Classification Search
CPC .... F16F 1/38; F16F 1/3842; F16F 1/30; F16F 1/3863
See application file for complete search history.

(56) References Cited

U.S. PATENT DOCUMENTS 6,755,405 B2 * 6/2004 Kammel ............... F16F 1/3842
267/141.1
9,278,603 B2 * 3/2016 Yoshizawa ........... B60G 21/055
(Continued)

FOREIGN PATENT DOCUMENTS

| CN | 101373009 A | 2/2009 |
| CN | 106795932 A | 5/2017 |

(Continued)

OTHER PUBLICATIONS

International Search Report, PCT/EP2019/058442, dated Jun. 12, 2019.
(Continued)

*Primary Examiner* — Robert A. Siconolfi
*Assistant Examiner* — Mahbubur Rashid
(74) *Attorney, Agent, or Firm* — Cohen & Hildebrand, PLLC

(57) ABSTRACT

A rubber bush with an inner part (2) which extends in an axial direction (x), an outer sleeve (3) which surrounds the inner part (2) at a spacing and comprises two half shells (4, 5) which are configured as identical parts, and a rubber body (6) which is arranged between the inner part (2) and the outer sleeve (3), wherein the half shells (3, 4) are connected to the inner part (2) by the rubber body (6) and, at their circumferential-side ends which face one another, have projections (7, 8) and depressions (9, 10), into which the projections (7, 8) are insertable.

13 Claims, 5 Drawing Sheets

(56) References Cited

U.S. PATENT DOCUMENTS

| | | | |
|---|---|---|---|
| 9,771,995 B2 | 9/2017 | Figura | |
| 10,184,512 B2 * | 1/2019 | Palluck | F16C 33/20 |
| 2002/0186905 A1 * | 12/2002 | Kammel | F16F 1/3873 |
| | | | 384/220 |
| 2018/0087567 A1 * | 3/2018 | Palluck | F16C 33/64 |
| 2019/0338826 A1 * | 11/2019 | Kolenda | F16F 13/1472 |

FOREIGN PATENT DOCUMENTS

| | | | | |
|---|---|---|---|---|
| CN | 107646081 A | | 1/2018 | |
| DE | 102015108879 A1 | * | 12/2016 | ............ F16C 17/035 |
| DE | 102015016454 A1 | * | 6/2017 | ............ F16F 1/3842 |
| DE | 102015016454 A1 | | 6/2017 | |
| EP | 0496044 A1 | | 7/1992 | |
| EP | 1071571 B1 | * | 10/2004 | ......... B60G 21/0551 |
| EP | 1977917 A2 | | 10/2008 | |
| JP | 3963592 B2 | * | 8/2007 | ......... B60G 21/0551 |
| WO | 2016078828 A1 | | 5/2016 | |

OTHER PUBLICATIONS

International Preliminary Report On Patentability, PCT/EP2019/058442, dated Oct. 6, 2020.

* cited by examiner

RUBBER BUSH

This is an application filed under 35 USC § 371 of PCT/EP2019/058442, filed on Apr. 3, 2019 claiming priority to DE 10 2018 108 029.8, filed on Apr. 5, 2018, each of which is herein incorporated by reference in its entirety.

BACKGROUND OF THE INVENTION

The invention relates to a rubber bush with an inner part which extends in an axial direction, an outer sleeve which surrounds the inner part at a spacing and consists and/or is composed of two half shells configured as identical parts, and a rubber body arranged between the inner part and the outer sleeve.

Such a rubber bush is, for example, used to connect an axle carrier or subframe to a vehicle structure of a vehicle. The disadvantage of such a rubber bush is that the half shells are able to move relative to one another, which is associated with undesirable noise emission.

BRIEF SUMMARY OF THE INVENTION

On this basis, the object of the invention is to be able to avoid or at least reduce a movement of the half shells relative to one another.

The abovementioned rubber bush with an inner part which extends in an axial direction, an outer sleeve which surrounds the inner part at a spacing and consists or is composed of two half shells which are configured as identical parts, and a rubber body which is arranged between the inner part and the outer sleeve is, according to the invention, in particular further developed such that the half shells are connected to the inner part by means of the rubber body and at their circumferential-side ends which face one another, have projections and depressions, into which the projections are inserted or can be inserted.

By inserting the projections into the depressions a positive connection can be configured between half shells, which prevents or at least reduces a movement of half shells relative to one another. In this way an undesired noise emission due to a movement of the half shells relative to one another can be avoided or reduced. In addition, both half shells are connected together by the rubber body and with the inner part. This offers not only advantages when fitting the rubber bush, since the half shells are, preferably captively, connected by the rubber body with one another and with the inner part, but also allows in particular a correct alignment of the depressions and the projections relative to one another, so that the latter are able to insert without problems into the depressions. Preferably, the rubber body also contributes to a restriction of the manoeuvrability of the two half shells relative to one another. Finally, the configuration of the half shells as identical parts allows the rubber bush to be produced simply and economically.

The rubber bush is in particular intended for a vehicle, which is preferably a motor vehicle. Advantageously, the rubber bush is or forms a vehicle part.

The rubber bush and/or the outer sleeve is in particular associated with a longitudinal bearing axle running in an axial direction, which preferably runs through the middle of the rubber bush and/or through the outer sleeve. Preferably, the outer sleeve extends in an axial direction or in the direction of the longitudinal bearing axis. The inner part is in particular associated with an inner part longitudinal axis, preferably running in the axial direction, which preferably runs through the middle of the inner part.

Advantageously, the inner part extends in the direction of the inner part longitudinal axis. By way of example, the inner part longitudinal axis coincides with the longitudinal bearing axis and/or the inner part longitudinal axis runs, for example, parallel to the longitudinal bearing axis. A or any direction running transversely to\the axial direction and/or to longitudinal bearing axis and/or to inner part longitudinal axis is in particular referred to as a radial direction. By way of example, the inner part longitudinal axis is offset from the longitudinal bearing axis, in particular in a radial direction. Furthermore, a direction running about the longitudinal bearing axis and/or about the inner part longitudinal axis and/or about the inner part and/or about the outer sleeve is preferably referred to as a circumferential direction.

The inner part preferably has a cylindrical or rectangular-shaped configuration. By way of example, the inner part, in particular in cross section, has a circular, an oval or a rectangular or square-shaped outer peripheral contour. Preferably, a through hole extends, in particular in the axial direction, through the inner part, which preferably serves for attachment purposes. Advantageously, in the through hole a fastening means is introduced or can be introduced, by means of which the inner part is fixed or can be fixed to an, in particular first, component which is preferably an, in particular first, vehicle component. The fastening means is, for example, a screw or a bolt or a threaded bolt. The inner part is or preferably forms a dimensionally stable body. By way of example, the part consists of plastic or metal. The inner part preferably consists of aluminium or magnesium or an iron material, such as for example steel.

Each of the half shells is preferably configured as or substantially as a hollow half cylinder. By way of example, each of the half shells, in particular in cross section, has a semi-circular outer peripheral contour. With the projections inserted, preferably completely, into the depressions the outer sleeve is preferably configured as or substantially as a hollow cylinder. By way of example, the outer sleeve, where the projections are inserted, preferably completely, into the depressions, in particular has in cross section a circular outer peripheral contour. The half shells are or form in particular separate half shells or parts. Preferably, each of the half shells is or forms a dimensionally stable body. Preferably, each of the half shells consists of plastic or metal. By way of example, each of the half shells consists of aluminium or die-cast aluminium.

Preferably the rubber body extends, preferably in a radial direction, from the inner part to the outer sleeve. Advantageously, the rubber body preferably extends in the radial direction from the inner part to each of the half shells. Preferably, the rubber body is connected by a permanent bond and/or material bond with the inner part. By way of example, the rubber body is vulcanised onto the inner part. The rubber body is preferably connected by a permanent bond and/or material bond to each of the half shells. By way of example, the rubber body is vulcanised onto each of the half shells. Advantageously, each of the half shells is, in particular at least partially, embedded in or vulcanised into the rubber body. Preferably, the half shells on their circumferential-side ends or end faces which face one another are free or substantially free from the material of the rubber body. According to a possible configuration, the circumferential-side ends of the half shells which face one another are however covered with an, in particular thin, rubber skin which, by way of example is connected with the rubber body or formed by this. Furthermore, the projections and/or the depressions are preferably free or substantially free from the material of the rubber body. According to a possible configuration, the walls delimiting the projections and/or the depressions can, however, be covered with an, in particular thin, rubber skin which, by way of example is connected to with the rubber body or formed by this. Preferably the rubber body consists of an elastomer and/or rubber. The rubber body may, by way of example, also be referred to as an elastomer body. Furthermore, the rubber bush may, for example, be referred to as an elastomer bearing.

Preferably, the projections extend in a circumferential direction away from the or from the respective circumferential-side ends of the half shells. Advantageously, the shape of the depressions is matched to the shape of the projections. Preferably, the shape of each depression is matched to the shape of the particular projection of the projections which is inserted or can be inserted in the respective depression. In particular, in each of the depressions at least one or precisely one of the projections inserted or can be inserted, to the shape of which the shape of the or the respective depression is preferably matched. By matching the shape of the depressions to the shape of the projections a manoeuvrability of the half shells relative to one another can be restricted or avoided, in particular when the projections are inserted into the depressions.

According to one configuration, each of the half shells has one or precisely one of the projections and one or precisely one of the depressions. Here, the projection and the depression of each half shell are preferably provided on different circumferential-side ends of the or the respective half shell. This makes the half shells particularly easy to produce. Furthermore, in this way the insertability of the projections into the depressions is less vulnerable to manufacturing tolerances than with a larger number of projections and depressions.

Preferably, each of the depressions is delimited on either side in the axial direction. In this way an axial manoeuvrability of the half shells relative to one another can be limited or avoided, in particular when the projections are inserted into the depressions.

Advantageously, each of the depressions is delimited in the radial direction on one side or at least one side or on both sides. In this way a radial manoeuvrability of the half shells relative to one another, preferably in a radial direction, running through the projections, can be limited or avoided, in particular when the projections are inserted into the depressions. Preferably, the depressions are configured as grooves provided in the outer circumferential surfaces and/or in the inner circumferential surfaces of the half shells. Preferably, the grooves are in each case open towards the respective circumferential side end or one of the circumferential-side ends of the respective half shell.

According to a further development, each of the projections has an edge extending in the axial direction and two edges extending in or approximately in the circumferential direction, which on their transitions to the edge extending in the axial direction are chamfered and/or bevelled. The edge extending in the axial direction of each of the projections is in particular provided on the or a circumferential-side, preferably free, end of the or the respective projection. The two edges of each projection extending in or approximately in the circumferential direction are in particular provided on the or axial, preferably free, ends of the or the respective projection. As a result of the chamfering or bevelling, an insertion aid or introduction aid for the projections upon insertion into the depressions is provided, if due to production tolerances these are slightly offset in the axial direction in relation to the projections. Preferably, each of the projections, preferably in the circumferential direction, is configured in the shape of an, in particular isosceles, trapezium, which tapers preferably towards its circumferential-side, preferably free, end. This also provides an implementation possibility for an insertion aid or introduction aid, if due to production tolerances the depressions are slightly offset in the axial direction in relation to the projections.

According to one configuration the inner circumferential surface of the outer sleeve is conically widened towards both its axial ends. Advantageously, both axial ends of the outer sleeve face away from one another in the axial direction. Preferably, the inner circumferential surface of each half shell has two surface sections arranged consecutively in the axial direction, of which a first surface section runs as far as a first axial end of the or the respective half shell, in particular outwardly inclined to the axial direction and/or the longitudinal bearing axis, and a second surface section runs as far as a second axial end of the or the respective half shell, in particular outwardly inclined to the axial direction and/or the longitudinal bearing axis. Preferably, the two surface sections of each half shell merge, in particular in the axial direction. Alternatively, preferably in the axial direction, between the two surface sections of each half shell, for example a middle surface section is provided which, by way of example, runs in the axial direction. Preferably, the two axial ends of each half shell in the axial direction face away from one another. This in particular makes the introduction of inserts of a vulcanisation tool for the forming of the rubber body in the outer sleeve easier. Otherwise, there would be a risk that, due to production tolerances upon closing the vulcanisation tool the tool inserts come into contact with regions of the inner circumferential surface of the outer sleeve leading to misalignment of the half shells in the closed vulcanisation tool. By way of example, the outer circumferential surface of the outer sleeve and/or each half shell runs, in particular fully, straight or approximately straight in the axial direction.

Preferably, the inner surface or inner circumferential surface of each projection has two surface sections arranged consecutively in the axial direction, of which a first surface section runs as far as a first axial end of the or the respective projection, in particular outwardly inclined to the axial direction and/or the longitudinal bearing axis, and a second surface section runs as far as a second axial end of the or the respective projection, in particular outwardly inclined to the axial direction and/or the longitudinal bearing axis. Preferably, both surface sections of each projection, merge in particular in the axial direction. Alternatively, preferably in the axial direction, between the two surface sections of each projection, for example a middle surface section is provided which, by way of example, runs in the axial direction. Preferably, the two axial ends of each projection in the axial direction face away from one another. In this way also, for example the introduction of inserts or the insert of the or a vulcanisation tool in the outer sleeve is made easier. Preferably, the outer surface or outer circumferential surface of each projection runs, in particular fully, straight or approximately straight in the axial direction.

According to a further development, in each case between the circumferential-side ends which face one another of the half shells in the circumferential direction a gap is provided. Preferably, the gap is closed or narrowed upon introduction and/or insertion and/or pressing in of the rubber bush in a bearing housing assembly. Advantageously, through the closing or narrowing of the gap the projections insert, in particular fully, into the depressions. Preferably, by the closing or narrowing of the gap the circumferential-side ends which face one another of the half shells are positioned next to one another. Advantageously, by the closing or narrowing of the gap, the rubber body is placed under, in particular radial, pre-tension. By way of example, the level of the pre-tensioning is, in particular, therefore adjustable by the gap width of the gap prior to closing or narrowing of the gap.

The insertion of the projections into the depressions is preferably referred to as nesting. The depressions and the projections that are inserted or can be inserted in these preferably form a nesting.

Between the inner part and the outer sleeve and/or between the inner part and the half shells recesses are preferably provided in the rubber body, which preferably extend in the axial direction and by way of example are referred to as pockets. Advantageously, between the inner part and the circumferential-side ends which face one another of the half shells in each case one of these recesses is provided. By way of example, the recesses extend in the axial direction through the rubber body.

Alternatively, the recesses, in particular in the axial direction, are for example pocket-shaped and/or the recesses extend, in particular in the axial direction, for example into the rubber body and terminate in this. In this case, it is possible for two or each of the recesses in the axial direction to be arranged opposite one another and together to form a or in each case a recess pair. The number of recesses is preferably two or four. Advantageously the number of recess pairs is two. Preferably, the recesses are rectangular or oval in cross section. By way of example, the recesses and/or the recess pairs, in particular in the radial direction, are of different sizes.

In this way, for example, a higher loading of the rubber body acting in the direction of the larger recess and/or the larger recess pair in the installed state of the rubber bush is taken into account. Alternatively, the recesses and/or the recess pair are, for example, identical in size. Advantageously, the recesses or the recess pairs in the radial direction and/or in relation to the longitudinal bearing axis are positioned opposite one another.

On the inner circumference of the outer sleeve and/or on the inner circumference of the half shells, axial stops, in particular in the form of projections, are provided, which preferably extend in the radial direction. Advantageously, the axial stops form axial stop pairs, wherein the axial stops of each axial stop pair are arranged spaced apart from one another in the axial direction. Preferably, the axial stop pair are positioned opposite one another in the radial direction and/or in relation to the longitudinal bearing axis. Preferably, the inner part in the axial direction is arranged between the axial stops of each axial stop pair and/or secured by a positive connection. Advantageously, the axial stops are offset from the circumferential-side ends which face one another of the half shells in the circumferential direction, by way of example by 90°. The number of axial stops is preferably two or four. Advantageously, the number of axial stop pairs is two. On each of the half shells one of the axial stop pairs is preferably provided. By means of the axial stops in particular an axial movement of the inner parts relative to the outer sleeve and/or relative to the half shells can be limited.

The invention also relates to an assembly with one or at least one rubber bush according to the invention and a bearing housing assembly, in which one or at least one, preferably cylindrical, bearing receiving hole is provided, in which the rubber bush, in particular with its outer sleeve, is introduced and/or fitted and/or inserted. The assembly according to the invention and/or its rubber bush can be further developed according to all the configurations described in connection with the rubber bush according to the invention. Furthermore, the rubber bush according to the invention can be further developed according to all configurations described in connection with the assembly according to the invention.

The assembly is in particular envisaged for a vehicle, which is preferably a motor vehicle. Advantageously, the assembly is or forms a vehicle assembly.

Preferably, the projections are inserted by the introduction and/or pressing in of the rubber bush into the bearing receiving hole, in particular fully, in the depressions.

Advantageously, through the introduction and/or pressing in of the rubber bush into the bearing receiving hole the gap provided in the circumferential direction between the circumferential-side ends which face one another of the half shells is narrowed or closed. By way of example, through the introduction and/or pressing in of the rubber bush in the bearing receiving hole the circumferential-side ends which face one another of the half shells are positioned next to one another. Advantageously, through the introduction and/or pressing in of the rubber bush in the bearing receiving hole the rubber body is placed under, in particular radial, pre-tension.

According to a further development, the projections are in particular fully inserted into the depressions. Advantageously, the rubber body is under, in particular radial, pre-tension. Preferably, the gaps are closed. Preferably, the circumferential-side ends which face one another of the half shells in the circumferential direction lie next to one another. Advantageously, the rubber body lies in a direction offset from the circumferential-side ends which face one another of the half shells in the circumferential direction by 90° on the outer sleeve and/or on the half shells.

The bearing housing assembly is or comprises, by way of example, a bearing support sleeve delimiting the bearing receiving hole and/or the bearing housing assembly has, for example, a bearing eye forming the bearing receiving hole. The bearing housing assembly is or in particular forms a, preferably second, assembly, which is preferably a, preferably second, vehicle assembly.

The bearing housing assembly is or forms preferably a dimensionally stable body. By way of example, the bearing support assembly consists of plastic or metal. The bearing support assembly preferably consists of aluminium or magnesium or an iron material, such as for example steel.

The first assembly or vehicle assembly is, for example, a vehicle assembly, and the second assembly or vehicle assembly is, for example, an axle carrier or subframe. Alternatively, the second assembly or vehicle assembly is, for example, a vehicle assembly, and the first assembly or vehicle assembly is, for example, an axle carrier or subframe. The axle carrier is preferably a rear axle carrier.

According to an advantageous configuration of the rubber bush and/or the assembly, the nested design is integrated into the structurally identical half shells. The vulcanisation tool comprises preferably a mould with a first or a top insert, a second or bottom insert and two separate strips. The loading of the half shells into the vulcanisation tool preferably takes place in the separated strips, in particular at 90° to the mould separation. Thus, the contours of the nestings can be easily transferred into the rubber bush. The nesting and the inner contour of the contact surface preferably designed to tape towards the upper and lower insert. In this way, in particular when closing the mould, contact between the insert and the half shell is prevented and the half shells in the region of their circumferential-side ends in the closed state of the mould are preferably pushed onto seals of the separated strips. Preferably, production tolerances of the half shells are taken into account and a process-safe outcome when sealing the rubber is achieved. In particular, a play-free and rubber-free contact contour between the half shells is the basis for a movement-free nesting. Minor rubber residues in the mould separations do not have any adverse effect here. If the bearing is mounted first of all in the vehicle, the gap between the half shells preferably is or becomes closed, so that in particular high radial stiffness conditions can be achieved. The nesting, preferably in connection with a rear axle carrier or subframe as the bearing housing assembly, prevents in particular a relative displacement in the radial and axial direction. Preferably, the entire system is thus stiffer and friction noises are prevented.

BRIEF DESCRIPTION OF THE DRAWINGS

The invention is described in the following on the basis of a preferred embodiment with reference to the drawing. The drawing shows as follows.

DETAILED DESCRIPTION OF THE INVENTION

Figure 1:
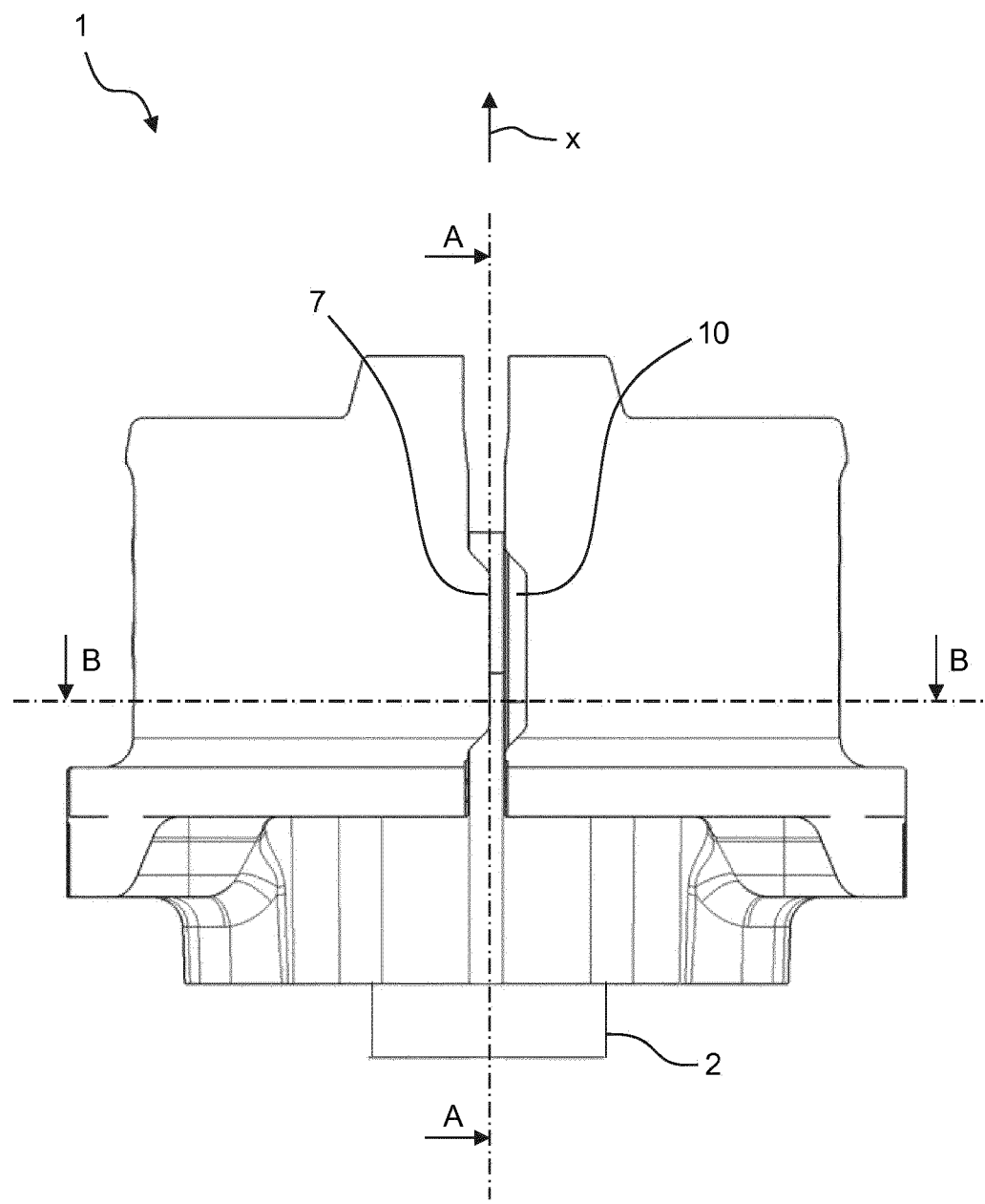
FIG. 1 a side view of a rubber bush according to an embodiment.
Figure 2:
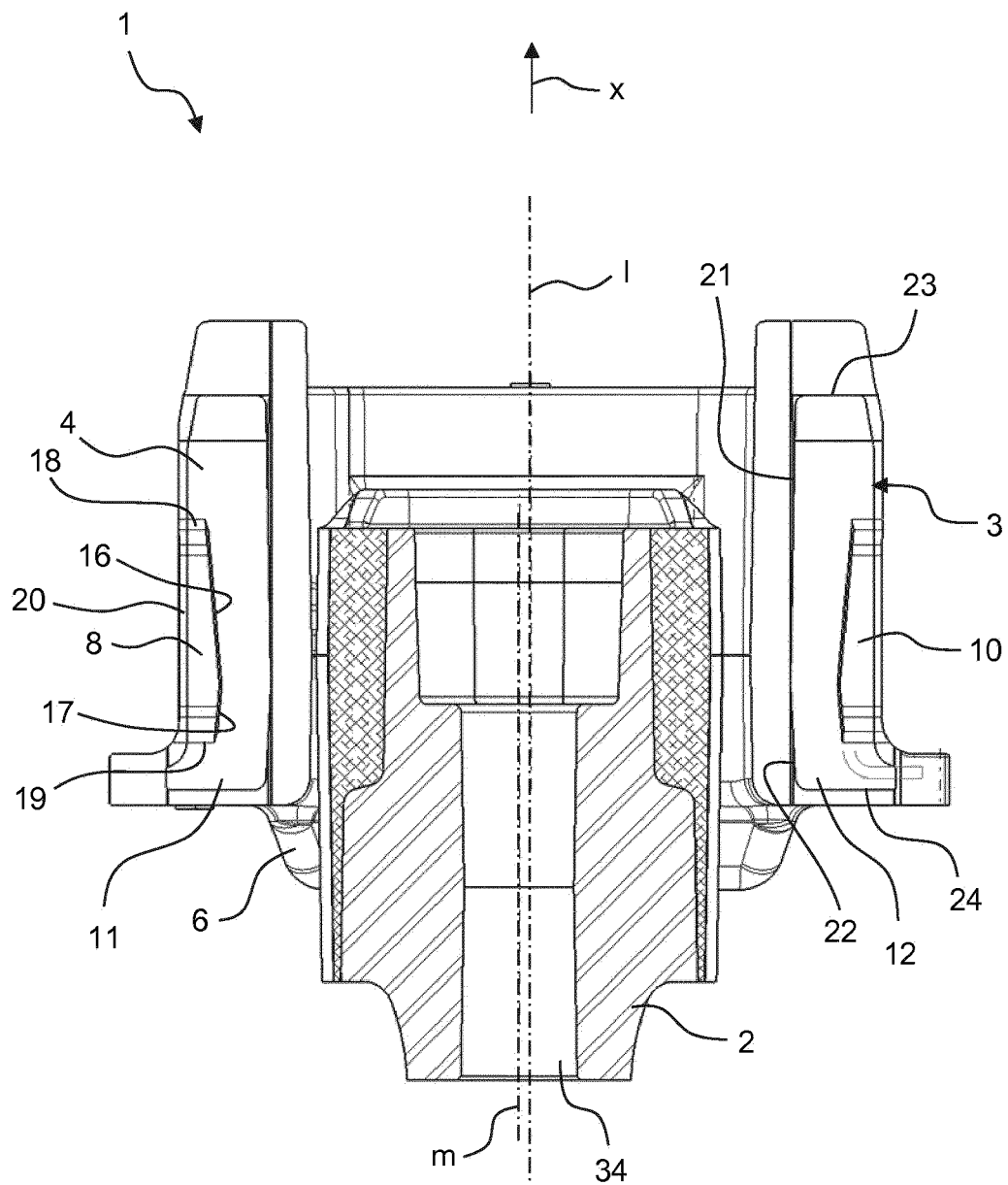
FIG. 2 a section through the rubber bush along the line of intersection A-A shown in FIG. 1.
Figure 3:
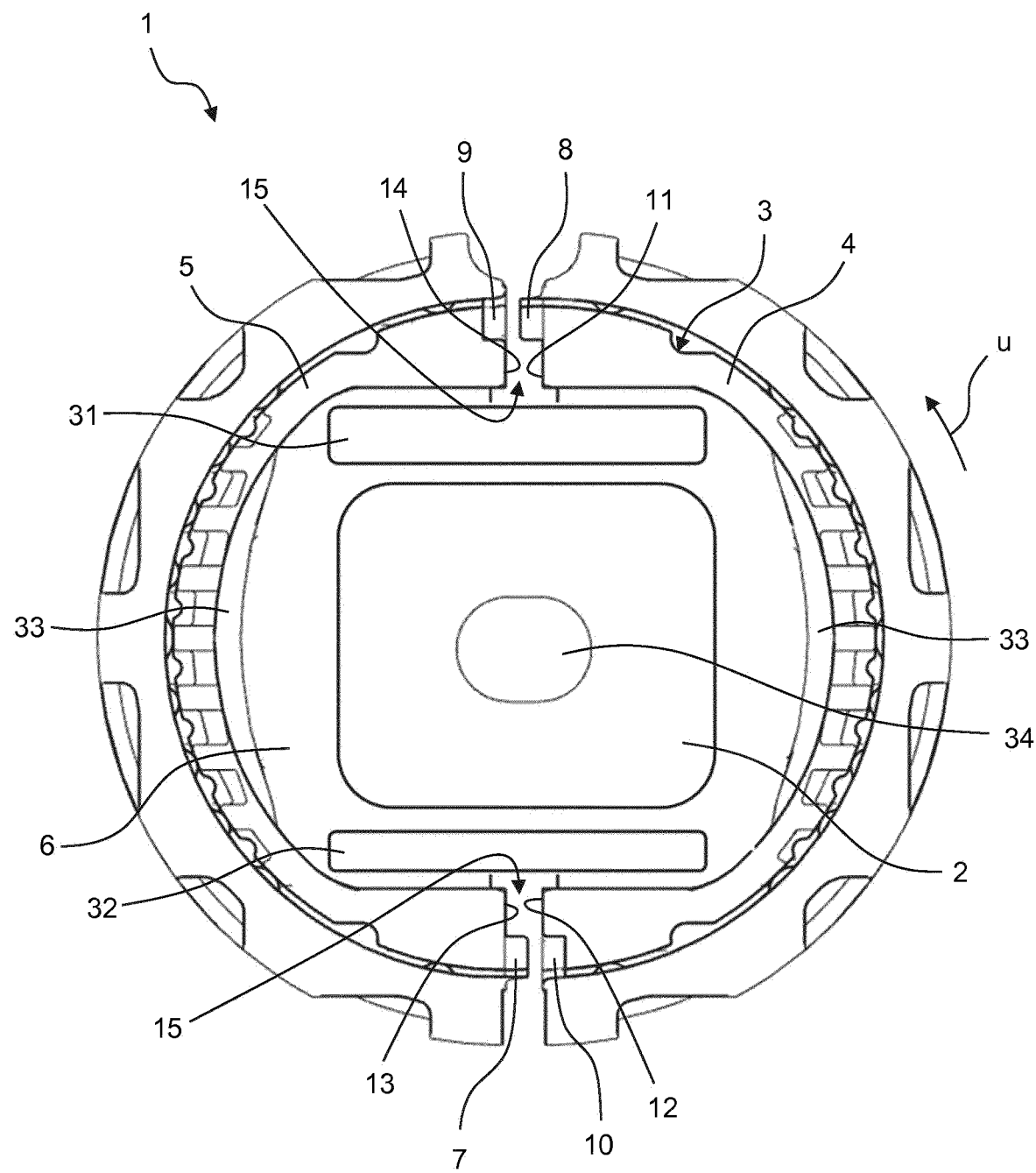
FIG. 3 a cross section through the rubber bush along the line of intersection B-B shown in FIG. 1.

FIG. 1 shows a side view of a rubber bush 1 according to an embodiment, whereas FIG. 2 shows a cross section through the rubber bush 1 along the line of intersection A-A shown in FIG. 1 and FIG. 3 a cross section through the rubber bush 1 along the line of intersection B-B shown in FIG. 1. The rubber bush 1 comprises an inner part 2 which extends in an axial direction, an outer sleeve 3 which surrounds the inner part 2 at a spacing and consists and/or is composed of two half shells 4 and 5 configured as identical parts, and a rubber body 6 arranged between the inner part 2 and the outer sleeve 3, wherein the half shells 4 and 5 are connected by means of the rubber body 6 with the inner part 2. Furthermore, the rubber bush 1 is associated with a longitudinal bearing axis l running in the axial direction x, which in particular runs through the middle of the outer sleeve 3. On their circumferential-side ends which face one another the half shells 4 and 5 have projections 7 and 8 and depressions 9 and 10, in which the projections 7 and 8 can be inserted. Here the half shell 4 has the projection 8 and the depression 10. Furthermore, the half shell 5 has the projection 7 and the depression 9.

The projection 8 and the depression 10 are provided on different circumferential-side ends 11 and 12 of the half shell 4, wherein the projection 8 is provided on a first of the circumferential-side ends 11 of the half shell 4 and the depression 10 on a second of the circumferential-side ends 12 of the half shell 4. Here the projection 8 extends in the circumferential direction u from the first circumferential side end 11 of the half shell 4. Furthermore, the depression 10 is configured as a groove provided in the outer circumferential surface of the half shell 4, which is open to the second circumferential side end 12 of the half shell 4. The half shell 4 is, for example, also referred to as a first half shell.

The projection 7 and the depression 9 are provided on different circumferential-side ends 13 and 14 of the half shell 5, wherein the projection 7 is provided on a first of the circumferential-side ends 13 of the half shell 5 and the depression 9 on a second of the circumferential-side ends 14 of the half shell 5. Here the projection 7 extends in the circumferential direction u from the first circumferential side end 13 of the half shell 5. Furthermore, the depression 9 is configured as a groove provided in the outer circumferential surface of the half shell 5, which is open to the second circumferential side end 14 of the half shell 5. The half shell 5 is, for example, also referred to as a second half shell.

Between the inner part 2 and the outer sleeve 3 recesses 31 and 32 are provided in the rubber body 6, which extend in the axial direction x and in cross section have a rectangular configuration, wherein between the inner part 2 and the circumferential-side ends which face one another of the half shells 4 and 5 in each case one of the recesses is provided. According to the embodiment shown, the recesses 31 and 32, in particular in the radial direction, are of different sizes. Alternatively, however, the recesses can also be of the same size. Furthermore, on the inner circumference of the half shells 4 and 5 axial stops 33 extending in the radial direction for the inner part 2 are provided, wherein the axial stops 33 are offset by 90° from the circumferential-side ends which face one another of the half shells 4 and 5 in the circumferential direction u. By means of the axial stops 33 in particular an axial movement of the inner part 2 relative to the outer sleeve 3 can be limited. A through hole 34 also extends through the inner part 2 in the axial direction x. The inner part 2 is associated with an inner part longitudinal axis m, which runs centrally through the inner part 2.

The inner part longitudinal axis m is, in particular, due to the different sizes of the recesses 31 and 32, offset from the longitudinal bearing axis l and preferably runs parallel to this.

Between the circumferential-side ends which face one another of the half shells 4 and 5 in the circumferential direction u in each case a gap 15 is provided, which can be closed or narrowed by pushing together the half shells 4 and 5. As a result of the pushing together the projections 7 and 8 also insert into the depressions 9 and 10, wherein projection 7 inserts into the depression 10 and projection 8 inserts into the depression 9. Furthermore, the rubber body 6 is placed under pre-tension by the pushing together.

FIG. 1 shows how the projection 7 is configured in the shape of an isosceles trapezium, which tapers preferably on its circumferential-side, preferably free, end. The shape of the depression 10 is matched to the shape of the projection 7, so that the depression 10 is configured in the shape of a corresponding or congruent trapezium, which extends towards the opposing projection 7. Since the half shells 4 and 5 are configured as identical parts, the projection 8 is configured to correspond with projection 7. Furthermore, the depression 9 is configured to correspond with depression 10. The trapezoidal shape makes inserting the projections into the depressions easier when pushing together the half shells. Furthermore, FIGS. 1 and 2 show how the depression 10 in the axial direction x is delimited on either side and in the radial direction inwardly. This applies correspondingly to the depression 9. Here, the radial direction denotes in particular a or any direction running transversely to the axial direction x and/or transversely to the longitudinal bearing axis I. The expression "inwardly" means in particular in the direction of the longitudinal bearing axis I and/or the inside of the rubber bush 1.

FIG. 2 shows how the inner surface or inner circumferential surface of the projection 8 has two surface sections 16 and 17 arranged consecutively in the axial direction x, of which a first surface section 16 runs as far as a first axial end 18 of the projection 8 outwardly inclined to the axial direction x, and a second surface section 17 runs as far as a second axial end 19 of the projection 8, outwardly inclined to the axial direction x. The outer surface or outer circumferential surface 20 of the projection 8 on the other hand runs in the axial direction x fully straight. Since the half shells 4 and 5 are configured as identical parts, the projection 7 is configured to correspond with projection 8. Furthermore, the shape of the depression 10 is matched to the shape of the projection 7 and/or to the shape of the projection 8. Since the half shells 4 and 5 are configured as identical parts, the depression 9 is configured to correspond with depression 10.

FIG. 2 also shows how the inner surface or inner circumferential surface of the half shell 4 has two surface sections 21 and 22 arranged consecutively in the axial direction x, of which a first surface section 21 runs as far as a first axial end 23 of the half shell 4 outwardly inclined to the axial direction x and a second surface section 22 runs as far as a second axial end 24 of the projection 4, outwardly inclined to the axial direction x. Since the half shells 4 and 5 are configured as identical parts, the inner circumferential surface of the half shell 5 is configured to correspond with the half shell 4. This configuration of the half shells 4 and 5 leads to the inner circumferential surface of the outer sleeve 3 being conically widened towards both its axial ends.

Figure 4:
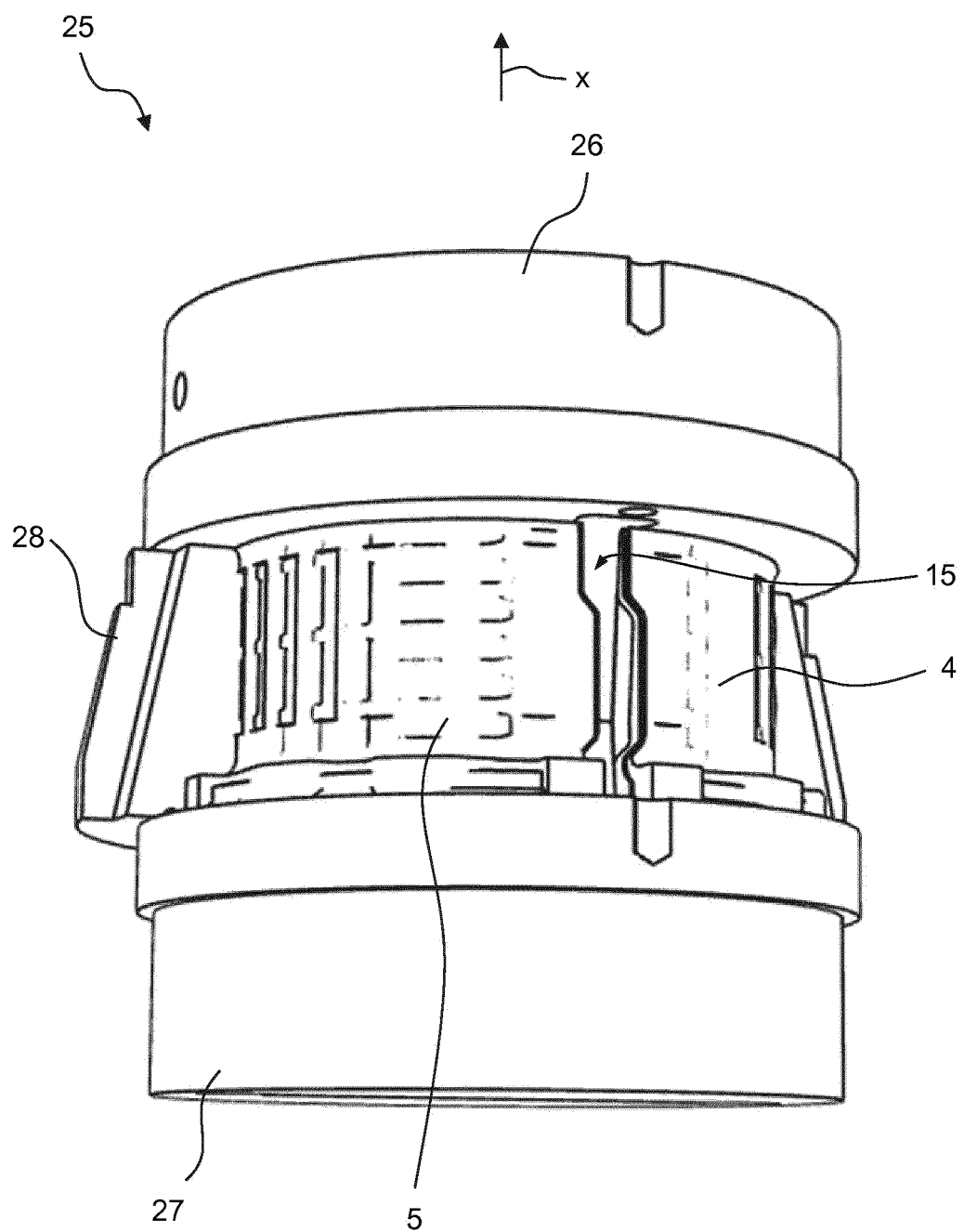
FIG. 4 a perspective partial view of a vulcanisation tool for producing the rubber bush.

FIG. 4 is a perspective partial view of a vulcanisation tool 25, having a mould with a first insert 26, a second insert 27 and strips 28, of which only one strip is show, so that the half shells 4 and 5 used in the vulcanisation tool 25 are visible. Here, the half shells 4 and 5 are inserted in the vulcanisation tool 25 in such a way that a half shell separation plane running in the axial direction x and between the circumferential-side ends which face one another of the half shells 4 and 5 is offset from a strip separating plane of the strips 28 running in the axial direction by 90° about the longitudinal bearing axis I. Furthermore, in the vulcanisation tool 25 the inner part 2 is inserted, which in FIG. 4 however is obscured by other parts and thus is not visible. The inclined surface sections 16, 17, 21 and 22 prevent in particular contact by regions of the inserts 26 and 27 introduced into the space between half shells 4 and 5 during introduction. The rubber body 6 to be formed by the vulcanisation tool 25 is not yet present in the representation according to FIG. 4. If the half shells 4 and 5 as well as the inner part 2 are inserted in the vulcanisation tool 25, their mould is closed and the rubber body 6 is formed by injection and subsequent vulcanisation of rubber in the mould, wherein the rubber body 6 is at the same time bonded to the half shells 4 and 5 and with the inner part 2. The outer sleeve 3 is also partially embedded in the rubber body 6.

Figure 5:
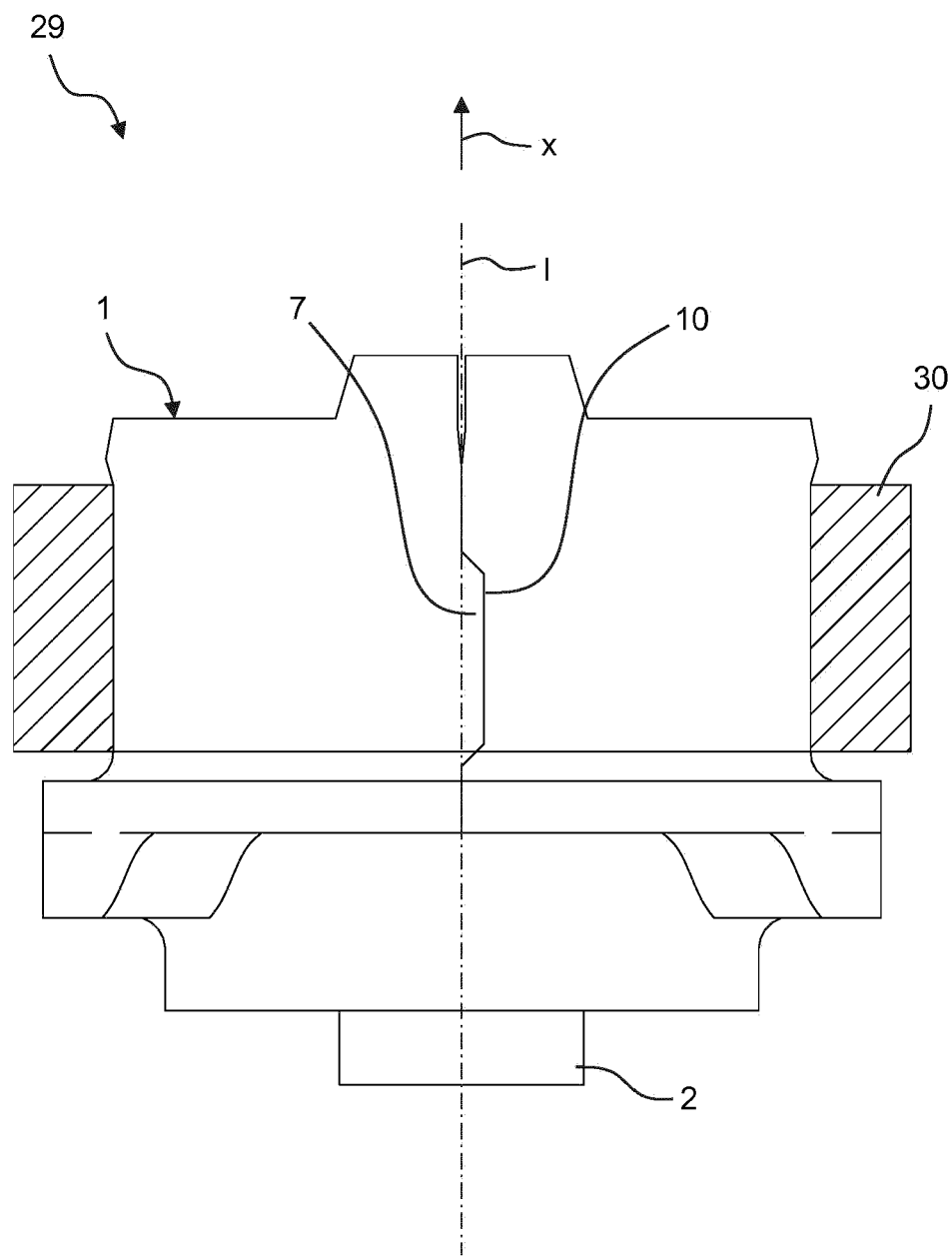
FIG. 5 a schematic and partially cut-away side view of an assembly with a Rubber bush according to the embodiment.

FIG. 5 is a schematic view of an assembly 29 with a rubber bush 1 according to the embodiment and a bearing housing assembly 30 shown partially cut away in the form of bearing support sleeve, which delimits a bearing receiving hole, into which the rubber bush 1 is pressed. As a result of the pushing in, the projections 7 and 8 are also inserted into the depressions 9 and 10.

LIST OF REFERENCE NUMERALS

1 Rubber bush
2 inner part of the rubber bush
3 Outer sleeve of the rubber bush
4 First half shell of the outer sleeve
5 Second half shell of the outer sleeve
6 Rubber body of the rubber bush
7 Projection of the second half shell
8 Projection of the first half shell
9 Depression of the second half shell
10 Depression of the first half shell
11 First circumferential-side end of the first half shell
12 Second circumferential-side end of the first half shell
13 First circumferential-side end of the second half shell
14 Second circumferential-side end
15 Gap
61 First surface section of the inner surface of the projection
17 Second surface section of the inner surface of the projection
18 First axial end of the projection
19 Second axial end of the projection
20 Outer surface of the projection
21 First surface section of the inner circumferential surface of the half shell
22 Second surface section of the inner circumferential surface of the half shell
23 First axial end of the half shell
24 Second axial end of the half shell
25 Vulcanisation tool
26 Vulcanisation tool insert
27 Vulcanisation tool insert
28 Vulcanisation tool strip
29 Assembly
30 Bearing housing assembly
31 Recess
32 Recess
33 Axial stop
34 Through hole
L Longitudinal bearing axis
m Inner part longitudinal axis
u Circumferential direction
x Axial direction

The invention claimed is:

1. A rubber bush comprising an inner part (2) which extends in an axial direction (x), an outer sleeve (3) which surrounds the inner part (2) at a spacing and comprises two identical half shells (4) and (5), and a rubber body (6) arranged between the inner part (2) and the outer sleeve (3), wherein the half shells (4, 5) are connected by the rubber body (6) with the inner part (2) and at their circumferential-side ends which face one another, have projections (7, 8) and depressions (9, 10), into which the projections (7, 8) are insertable;
wherein an inner surface of each of the projections (7, 8) has two surface sections (16, 17) arranged consecutively in the axial direction (x), a first surface section (16) of which runs as far as a first axial end (18) of the projection outwardly inclined and a second surface section (17) as far as a second axial end (19) of the projection outwardly inclined.

2. The rubber bush according to claim 1, wherein the projections (7, 8) extend in a circumferential direction (u) away from the respective circumferential-side ends of the half shells (4, 5).

3. The rubber bush according to claim 1 wherein in each of the depressions (9, 10) precisely one of the projections (7, 8) is insertable, to the shape of which the shape of the or the respective depression (9, 10) is matched.

4. The rubber bush according to claim 1, wherein each of the half shells (4, 5) has precisely one of the projections (7,

8) and precisely one of the depressions (9, 10), wherein the projection and the depression of each half shell are provided on different circumferential-side ends of the respective half shell.

5. The rubber bush according to claim 1, wherein each of the depressions (9, 10) is delimited on both sides in the axial direction (x).

6. The rubber bush according to claim 1, wherein each of the depressions (9, 10) is delimited at least on one side in a radial direction.

7. The rubber bush according to claim 1, wherein the depressions (9, 10) are configured as grooves provided in outer circumferential surfaces of the half shells (4, 5).

8. The rubber bush according to claim 1, wherein each of the projections (7, 8) is configured in the form of a trapezium, which tapers towards its circumferential-side free end.

9. The rubber bush according to claim 1, wherein an inner circumferential surface of the outer sleeve (3) is conically widened towards both its axial ends.

10. The rubber bush according to claim 1, wherein an outer surface (20) of each of the projections runs straight in the axial direction (x).

11. The rubber bush according to claim 1, wherein between the circumferential-side ends which face one another of the half shells (4, 5) in a circumferential direction (u) a gap (15) is provided.

12. A rubber assembly with at least one rubber bush (1) according to claim 1, having one bearing housing assembly (30), in which at least one bearing receiving hole is provided, in which the rubber bush (1) is introduced.

13. The rubber assembly according to claim 12, wherein the projections (7, 8) are inserted into the depressions (9, 10).

* * * * *